Nov. 27, 1962 — M. J. SCHMITZ ET AL — 3,066,191
AUTOMATIC TELECOMMUNICATION EXCHANGE
Filed Feb. 23, 1960 — 7 Sheets-Sheet 1

INVENTORS
B.J. TREURE
M.J. SCHMITZ
G.H. SCHOUTEN
BY
AGENT

Nov. 27, 1962 M. J. SCHMITZ ET AL 3,066,191
AUTOMATIC TELECOMMUNICATION EXCHANGE
Filed Feb. 23, 1960 7 Sheets-Sheet 7

INVENTORS
B. J. TREURE
M. J. SCHMITZ
G. H. SCHOUTEN
BY
Frank R. Trifari
AGENT

United States Patent Office 3,066,191
Patented Nov. 27, 1962

3,066,191
AUTOMATIC TELECOMMUNICATION
EXCHANGE
Mattheus Jacobus Schmitz, Gerrit Hilbertus Schouten,
and Bastiaan Jan Treure, all of Hilversum, Netherlands, assignors to North American Philips Company,
Inc., New York, N.Y., a corporation of Delaware
Filed Feb. 23, 1960, Ser. No. 10,445
Claims priority, application Netherlands Feb. 26, 1959
20 Claims. (Cl. 179—18)

This invention relates to automatic telecommunication exchanges in which each connected subscriber's set corresponds to an quadruple ($j$, $k$, $l$, $m$) of four natural numbers which can assume one of the values 1, 2 . . . $a$, one of the values 1, 2 . . . $b$, one of the values 1, 2 . . . $c$, and one of the values 1, 2 . . . $d$, respectively, but in which some of the four numbers $a$, $b$, $c$ and $d$, but not all four of them, may be equal to unity. Each subscriber's line in the exchange terminates in a line circuit which can signal only the states "subscriber's loop open" and "subscriber's loop closed" and, for this purpose, is provided with a signalling wire containing this signal, and the states of the subscriber's sets being registered in a memory intended therefor, the so-called subscriber's memory, the state "subscriber's set free" being indicated by the sign "0" and the state "subscriber's set busy" being indicated by the sign "1." The exchange is controlled by a control member which can receive information from a plurality of members of the exchange, including the subscriber's memory, and with the aid of the received information decides to which further member of the exchange this information is to be transmitted, the last-mentioned member, according to its function, either deriving from this information a new information or performing the control operation indicated by the said information. The invention more particularly indicates the structure of the circuit arrangement which permits of testing and registering the state of the loop of the subscriber's sets. The invention is characterized in that the signalling wires of the line circuits, for which $m$=constant, are connected to a loop test circuit so that the exchange possesses $d$ loop test-circuits, while each line circuit corresponds to a ring of rectangular magnetic material in the loop test-circuit having the same $m$ co-ordinate and to such a ring in the subscriber's memory, the rings in a loop test-circuit and in the subscriber's bookkeeping, for which $l$ and $m$ are constant, being ranged in a matrix so that each loop test-circuit includes at the most $c$ matrices and the subscriber's memory includes at the most $cd$ matrices; that each ring of the loop test-circuits carries at least four windings, that is to say, an input winding 21 connected to the signalling wire of the relevant line circuit, a $j$ winding 22 corresponding to the relevant $j$ co-ordinate, a $k$ winding 23 corresponding to the relevant $k$ co-ordinate, and an output winding 24, the $j$ windings of the same loop test-circuit being connected to outlets of a member J, at which pulses occur in a fixed pattern at a given instant of the pulse cycles, and the $k$ windings of the same loop test-circuit being connected to outlets of a member K at which pulses likewise occur in a fixed pattern at a given instant of the pulse cycles, the arrangement being such that for each ring of the loop test-circuits cycles of pulses occur in which both its $j$ winding and its $k$ winding conveys a pulse, whilst a ring in such a pulse cycle flips over at least one if its input winding contains the signal "subscriber's loop closed" but does not flip over and hence remains in the state indicated by the figure "0" if this winding contains the signal "subscriber's loop open," or conversely; that the pulses delivered by the members J and K, together with the pulse induced in the output winding of the relevant ring of the loop test-circuit and possibly a pulse in a wire 95 individually associated with the relevant loop test-circuit are used to prepare the driving of the corresponding ring of the subscriber's memory in coincidence to the state "1," so that this driving to the state "1" can be effected only if all four pulses previously mentioned are present, whilst each ring of the subscriber's bookkeeping carries an output winding 60 in which a pulse is induced when the ring flips over.

In order that the invention may be readily carried into effect, it will now be described in detail, by way of example, with reference to the accompanying drawings, in which.

Figure 1:
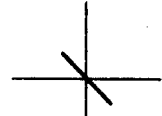
FIGS. 1 to 11 show several symbols used in the drawings, FIGS. 6 and 11 showing possible embodiments of two of the circuits represented by these symbols.
Figure 2:
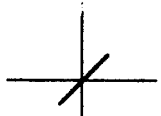
Figure 3:
Figure 4:
Figure 5:
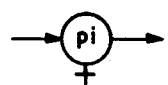
Figure 6:
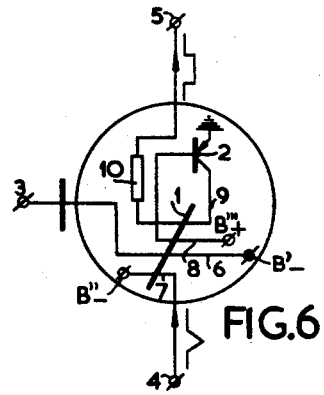

FIGS. 1 and 2 show the symbol used for a ring of a rectangular magnetic material. The surface of the ring is imagined to be at right angles to the plane of the drawing so that the ring is seen as a short, thick segment of a line. This segment of a line is shown in each case at an angle of 45°. The wires threaded through the ring are shown as horizontal or vertical lines intersecting the segment of a line. Each ring may be magnetized in two opposite senses, which states of magnetization are indicated by the figures 0 and 1 and referred to as the states of the ring. The value of the current pulses which can just flip over a ring is indicated by $i$. Consequently, a current pulse of the values $\frac{1}{2}i$ cannot flip over a ring. FIG. 3 shows the symbol for a direct-current source which supplies a direct current of the value $pi$ with the sense indicated by the arrow, wherein $p$ may be any arbitrary positive number. FIG. 4 shows the symbol for a pulse source which supplies a pulse of the value $pi$ with the sense indicated by the arrow at the instant $t_k$ of the pulse cycles. The term "pulse cycle" is to be understood herein to mean a recurring sequence of moments. A pulse cycle having four moments thus comprises the sequence of moments . . . $t_3$, $t_4$, $t_1$, $t_2$, $t_3$, $t_4$, $t_1$, $t_2$ . . . . FIG. 5 shows the symbol used for a cocking gate which, when triggered delivers a pulse of the value $pi$. The term "cocking gate" is to be understood herein to mean a circuit having a cocking terminal (indicated by a transverse dash), a triggering terminal (indicated by an arrow directed towards the circle representing the cocking gate) and an output terminal (indicated by an arrow directed away from the circle representing the cocking gate). When a pulse is led to the cocking terminal (cocking of the cocking gate) and then a pulse is led to the triggering terminal (triggering of the cocking gate), the output terminal of the cocking gate delivers an output pulse of the value $pi$. If, however, a pulse is led to the triggering terminal without the cocking gate having been cocked beforehand, the cocking gate does not deliver an output pulse. A triggered cocking gate can deliver a fresh pulse only after again having been cocked. A cocking gate thus has a memory function, since it can memorise its state (either cocked or not) for an unlimited period. A circuit having this property may readily be built up of known circuit elements. The memory element used for the cocking gate is preferably a ring of rectangular magentic material. FIG. 6 shows an example of a circuit of a cocking gate. In this figure, 1 indicates a ring of rectangular magnetic material, 2 indicates a transistor of the pnp-type, 3 indicates the cocking terminal, 4 indicates the triggering terminal, 5 indicates the output terminal, 6 indicates a cocking winding which is connected, at one end, to cocking terminal 3 and, at its other end, to a negative voltage source B'—, 7 indicates a triggering winding which is connected, at one end, to a negative voltage source B"— and, at its other end, to triggering terminal 4, 8 indicates a control winding which is connected, at one end, to the base of transistor 2 and, at its other end, to a positive voltage source B+'" and 9 indicates an output winding which is connected, at one end, to the collector of transistor 2 and, at its other end, to output terminal 5, if desired through a current-determining resistor 10. The emitter of transistor 2 is connected to earth. For the sake of simplicity, the various windings are represented in each case by a single wire passing through the ring 1, but actually they may comprise a more or less large number of turns around the core 1. The windings have the winding senses shown in the figures. The circuit elements may be, for example, the following:

Ring 1 _____ Four rings 5659140/6 E1.
Transistor 2 _____ OC 72.
Winding 6 _____ 40 turns (at 20 ma.).
Winding 7 _____ 40 turns (at 20 ma.).
Winding 8 _____ 28 turns.
Winding 9 _____ 8 turns (at 20 ma.).
Voltage source B' _____ 10 volts.
Voltage source B" _____ 10 volts.
Voltage source B'" _____ 3 volts.

The circuit arrangement operates as follows: When a current pulse of sufficient strength and duration (in the example under consideration 20 milliamps. for at least 20 microseconds) is led to cocking terminal 3, the ring 1 is driven to the state which will be referred to herein as the state "1." If the ring 1 was initially in the state "0," it assumes the state "1," and if the ring 1 was already in the state "1," it remains in this state. If, subsequently, a pulse is led to triggering terminal 4, the ring 1 starts to flip over to the state "0." A voltage thus induced in the control winding 8 overcomes the voltage supplied by the positive voltage source B'"+ and thus renders the base of transistor 2 negative. Consequently, the transistor, which is normally closed, is opened and current flows through output winding 9 and resistor 10 to the output terminal 5. Said current likewise drives the ring 1 to the state "0," the ring thus being completely driven to the state "0," even if the triggering pulse would already be terminated before the ring 1 has reached the state "0." During the flipping over from the state "1" to the state "0," the base of transistor 2 remains negative due to the voltage induced in control winding 8, so that transistor 2 remains open until the ring 1 has reached the state "0." The voltage induced in control winding 8 during cocking renders the base of transistor 2 even more negative than it already was so that transistor 2 remains closed during cocking. An improvement in this cocking gate has been described in U.S. patent application Serial No. 826,524, filed July 13, 1959, now U.S. Patent No. 3,015,742.

Figure 7:
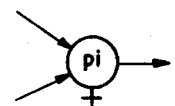

It will be evident that a cocking gate may alternatively comprise two separate triggering windings and hence also two triggering terminals so that it may be triggered by leading a triggering pulse either to one triggering terminal or the other. FIG. 7 shows the symbol used therefor.

Figure 8:
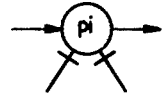
Figure 9:
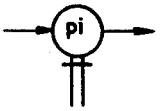

A cocking gate may likewise comprise two separate cockings windings and hence also two cocking terminals. By a suitable choice of the numbers of turns of the cocking windings, it may be ensured that the cocking gate can be cocked by leading a cocking pulse either to one cocking terminal or the other (symbol of FIG. 8), but also that the cocking gate can be cocked only in coincidence and hence only if a cocking pulse is led to the two cocking terminals simultaneously (symbol of FIG. 9).

Figure 10:
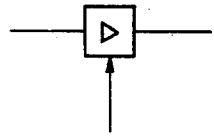

FIG. 10 shows the symbol used for a gate circuit with amplification (briefly referred to as "gate"). The input of the gate lies at the base of the triangle and its output at the apex of the triangle. The control terminal is indicated by the arrow. The gate is normally cut off, but is momentarily opened if a pulse is led to the control terminal. It is naturally also possible for the gate to be circuited so that it is normally conducting, but momentarily cut off if a pulse is led to the control terminal.

Figure 11:
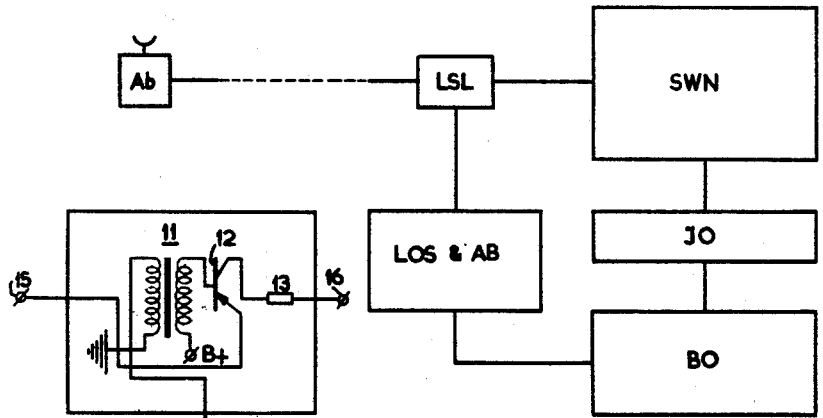

FIG. 11 shows an example of a gate which is normally cut off and momentarily made conducting by a pulse. The gate comprises a transformer 11, a pnp-transistor 12 and possibly a current-limiting resistor 13. The primary winding of transformer 11 is connected, at one end, to a control terminal 14 and, at its other end, to earth. The secondary winding of transformer 11 is connected, at one end, to a positive voltage source B+ and, at its other end, to the base of transistor 12. The collector of the transistor is connected via resistor 13 to an output terminal 16, its emitter being connected to an input terminal 15. The voltage of voltage source B+ keeps the transistor closed. The winding senses and the numbers of turns of the primary and secondary windings of the transformer are such that the occurrence of a pulse at control terminal 14 brings about a negative pulse at the base of transistor 12 of sufficient strength to make the latter momentarily conducting for a positive pulse or direct voltage applied to input terminal 15.

Figure 12:
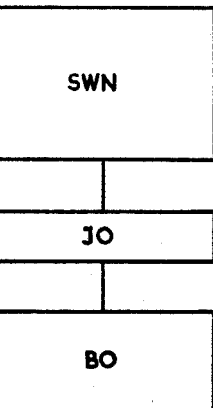
FIG. 12 shows the block diagram of a portion of a telephone exchange to which the invention has been applied.

FIG. 12 shows the block diagram of the members of an electronic telephone exchange directly co-acting with the arrangement according to the invention. In this figure, Ab indicates a subscriber's set, LSL a line circuit, that is to say, the equipment with which the subscriber's line leading from a subscriber's set to the exchange terminates in the exchange, and SWN indicates the telephone channel network, that is to say, the assembly of switches through which the telephone channels extend. In an electronic telephone exchange, the telephone channel network must be single wired for economical reasons. In view thereof, it is not possible to indicate by means of test wires whether the various paths through the telephone channel network, herein referred to as links, are busy or not, since such test wires are not available, whilst it may be undesirable for the information whether a link is busy or not to be derived from this link itself. In the last-mentioned case, it is practical to provide the exchange with a link memory, for example, of the kind described in U.S. patent application Serial No. 845,018, filed October 7, 1959. The absence of test wires in the telephone channel network makes it also practical for the line circuits to be designed so that they can signal only the states "subscriber's loop open" (receiver on the hook) and "subscriber's loop closed" (receiver lifted). This signal is bivalent and may consist in the presence or absence of a direct voltage (inclusive of earthing), but alternatively in a series of pulses occurring at given instants of pulse cycles. The signal may be produced by a direct-voltage source or a pulse source and led to a signalling wire of the line circuit via a mechanical or electronic switch controlled by the current in the subscriber's loop. Such a line circuit has been described in U.S. patent application Serial No. 761,220, filed September 15, 1958. The value of the signal in the closed state of the subscriber's loop is referred to as "the busy signal."

The signalling wires of the line circuits are connected to a loop test switch and a subscriber's memory LOS and AB, which member in turn is connected to a control member BO. In addition to other functions which will in part be referred to hereinafter and for another part are not essential to the invention, the control member BO can build up a desired connection in the telephone channel network.

U.S. patent application Serial No. 673,642, filed July 23, 1957, discloses a telephone channel network which is usable for the invention. A circuit serviceable for the control member BO has been described in U.S. patent application Serial No. 819,076, filed June 9, 1959. The adjusting member JO is essentially not different from a decoder which translates a group of codes received from control member BO into another code group which, when supplied to telephone channel network SWM, builds up or breaks up therein the desired path. The adjusting member may thus be built up in known manner with the use of known technical means.

The loop test-circuit and the subscriber's memory LOS and AB comprise two parts which most intimately co-act with each other and which are referred to as the "loop test-circuit LOS" and the "subscriber's memory AB." For each line circuit, the loop test circuit LOS includes a ring of rectangular magnetic material which carries an input winding which is connected to the signalling wire of the relevant line circuit and thus traversed by the busy signal produced by the line circuit in the closed state of the subscriber's loop. The circuit arrangement is otherwise designed so that each ring is tested individually as to whether its input winding contains the busy signal or not. The subscriber's memory AB likewise includes a ring of rectangular magnetic material for each line circuit and hence also for each connected subscriber's set. In a manner which will be described in detail hereinafter, the subscriber's memory and the members co-acting with it are designed so that, with a small time difference, the ring corresponding to a given subscriber's set is in the one magnetic state (herein referred to as the state "0") if the subscriber's loop in the set is open (receiver on the hook) and in the other magnetic state (herein referred to as the state "1") if the subscriber's loop in the set is closed (receiver lifted). The loop test-circuit and the subscriber's memory are consulted for both the outgoing and the incoming connections.

When a subscriber $Ab$ wants to call, he lifts his receiver so that his subscriber's loop is closed and the input winding of the corresponding ring in the loop test-circuit LOS is thus traversed by the busy signal. After some time it is ascertained in loop test-circuit LOS that the input winding of this ring contains the busy signal. A signal is then transmitted to the subscriber's memory AB, containing as information the question: "is the relevant subscriber's loop registered as open (ring in state "0") or as closed (ring in state "1"). When the relevant subscriber's loop was registered as open (ring in state "0"), it is written as closed by reading this ring, that is to say, the relevant ring is set to the state "1" and a signal is transmitted to the control member BO containing the information: "Subscriber so and so wishes to establish a connection." If, however, the relevant subscriber's loop was registered as closed (ring in state "1"), the conclusion was be made that either the relevant subscriber had already lifted his receiver some time before, which fact was ascertained by the loop test-switch and passed on via the subscriber's memory to the control member, or the relevant subscriber was rung up by another subscriber some time before and on behalf of this connection there was written busy by the control member. In neither case is it necessary to transmit information to the control member BO.

If another subscriber rings up the relevant subscriber, there arises a stage in which it must be known whether the subscriber called is free or busy. At this stage, the control member BO transmits a signal to the subscriber's memory AB, containing as information the question: "Is the subscriber's loop which is called registered as open or closed?" In the former case the control member BO can build up a connection to this subscriber. In the latter case, a busy tone is to be transmitted to the calling subscriber.

In the description following hereinafter, it is assumed that the place of a line circuit in the exchange may be characterized by an $n$-tiple of three natural numbers indicated by the symbol $(j,k,l)$, wherein $j$, $k$ and $l$ may be one of the numbers $1, 2 \ldots a$, one of the numbers $1, 2 \ldots b$, and one of the numbers $1, 2 \ldots c$, respectively.

Figure 13:
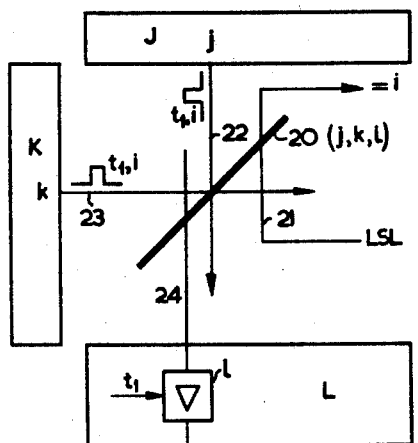
FIGS. 13, 14 show the principles of two ring circuits which permit of signalling the state of the loop of a subscriber's set.

FIG. 13 shows a first way how the state of the subscriber's loop in the loop test-circuit LOS can be tested. A ring 20 of rectangular magnetic material corresponds to a line circuit $(j, k, l)$. This ring carries windings 21, 22, 23, 24. Winding 21 is connected to the signalling wire of the line circuit $(j, k, l)$, thus being traversed by the signal produced by this line circuit. Said signal is assumed here to be no current if the subscriber's loop $(j, k, l)$ is open and a direct current of the strength $i$ if the subscriber's loop $(j, k, l)$ is closed, $i$ represents a current strength at which the ring can be flipped over. Winding 22 is connected to the $j^{th}$ outlet of a member $j$ having $a$ outlets and winding 23 is connected to the $k^{th}$ outlet of a member K having $b$ outlets. The members J and K are such that their outlets deliver in cyclic sequence a current pulse $i$ at the moment $t_1$ of the pulse cycles. The senses of the currents in the windings 21, 22 and 23 are indicated by arrows in FIG. 13. Winding 24 is connected to the input of the $l^{th}$ gate of a member L. The member L has $c$ gates which are momentarily made conducting at the moments $t_1$ of the pulse cycles, but which are normally cut off. It may be proved that, if $a$, $b$ and $c$ are non-divisible in pairs, for each system permissible values of $j$, $k$, $l$ pulse cycles occur in which the outlet $j$ of the member J and the outlet $k$ of the member K simultaneously deliver a current pulse and the gate $l$ of the member L is momentarily conducting. If the subscriber's loop $(j, k, l)$ is open, no current flows through the winding 21, but current pulses of the value $i$ periodically flow through the windings 22 and 23. The ring 20 thus remains in the state "0" and pulses are not induced in winding 24. However, if the subscriber's loop $(j, k, l)$ is closed, a current of the value $i$ traverses winding 21 and sets ring 20 to the state "1." At the moments $t_1$ of the pulse cycles in which the windings 22 and 23 simultaneously convey a current pulse, the ring 20 flips over to the state "0" at the beginning of these current pulses and returns to the state "1" at the end thereof. Consequently, a double pulse is induced in winding 24. One of the two pulses of the double pulse is passed at those of the above-mentioned moments at which gate $l$ is open.

Figure 14:
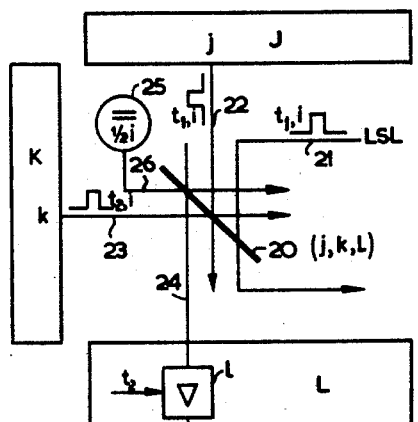

FIG. 14 shows another way of observing the state of the subscriber's loop. This circuit differs from that of FIG. 13 in that the ring 20 now also includes a winding 26 powered by a direct-current source 25, which winding is traversed by a direct current of the value $\frac{1}{2}i$. The line circuit must now be designed so that the busy signal from current pulses occurring at the moment $t_1$ are of the value $i$. The member J is such as to deliver a current pulse of the value $i$ only at the moments $t_1$, the member K such as to deliver a pulse of the value $i$ only at the moments $t_2$, and the member L such that a gate is opened only at the moments $t_2$. The senses of the currents in the windings 21, 22, 23, 26 are again indicated by arrows. When the subscriber's loop $(j, k, l)$ is open, then at the moments $t_1$ when the winding 22 conveys current, the ring 20 receives a current pulse driving to the state "1," which current pulse has a value $$i + i - \frac{1}{2}i = \frac{3}{2}i \text{ or } i = \frac{1}{2}i = \frac{1}{2}i$$

according as winding 22 at such a moment conveys current or not, and at the moments $t_2$ when the winding 23 conveys current, receives a pulse driving to the state "0," which pulse has a value $$i + \frac{1}{2}i = \frac{3}{2}i$$

and at all the other moments receives a direct current driving to the state "0," which current has a value $\frac{1}{2}i$. The ring 20 thus flips over to the state "1" at given moments $t_1$ and to the state "0" at given moments $t_2$. Consequently, at these moments, a pulse is induced in winding 24. At those of the moments $t_2$ at which gate $l$ is open, the pulse then induced in winding 24 is passed. It will be evident that in regard to the tolerance in the value of $i$, this circuit is more critical than the preceding. In addition, it must be continually powered by a direct-voltage source.

Figure 15:
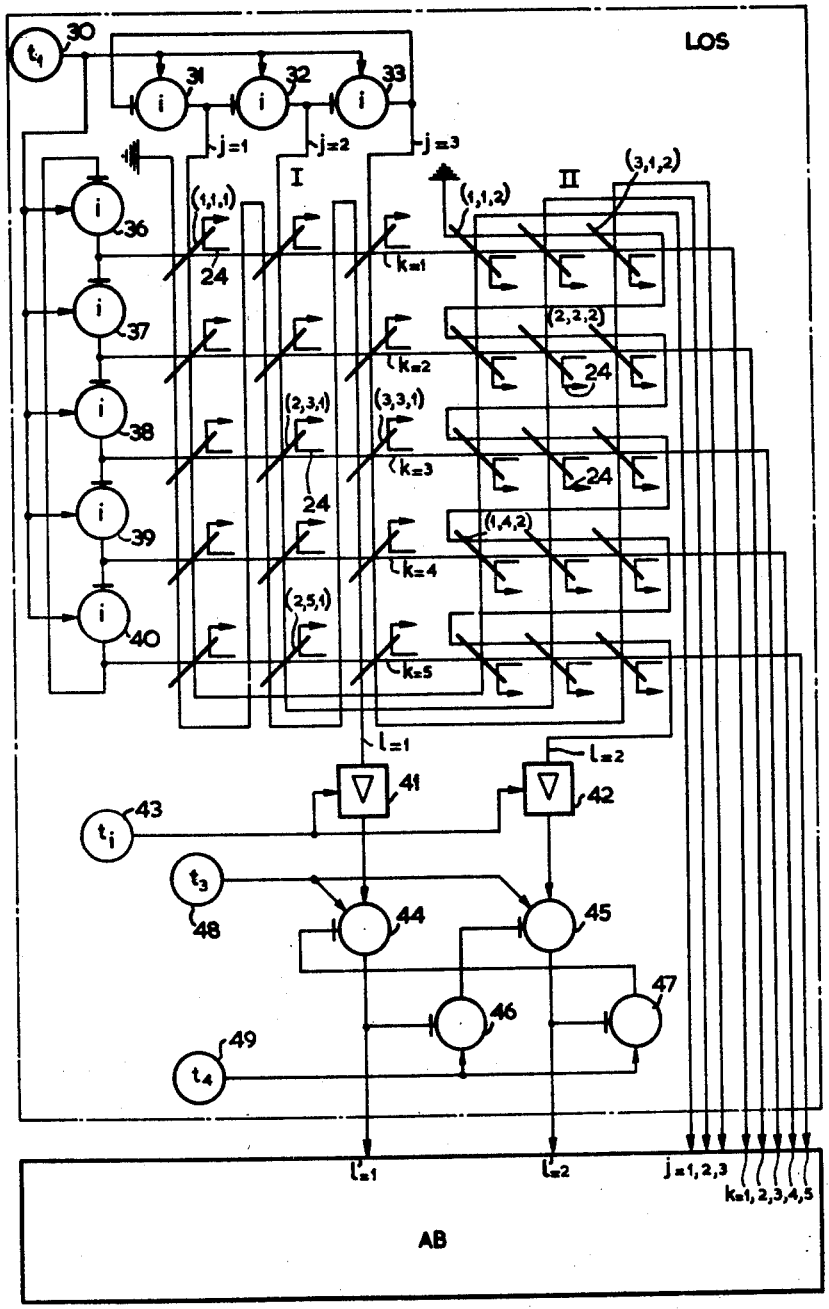
FIGS. 15, 16 show in common the diagram of the principle of one embodiment of the portion of the exchange to which the invention relates.

FIG. 15 shows the diagram of a loop test-circuit LOS in which the state of the loop is tested in the manner shown in FIG. 13. For the sake of simplicity, very small values have been chosen for $a$, $b$ and $c$, viz. $a=3$, $b=5$, $c=2$. The member J is constitute by three cocking gates 31, 32, 33, circuited in the form of a ring, which are triggered by a pulse source 30 at the moment $t$ of each pulse cycle. In FIG. 15, the triggering windings of the said three cocking gates are shown in parallel combination for the sake of simplicity, but actually these triggering windings are connected in series. A similar remark applies to many further windings shown in parallel combination. Let it be assumed that, at the beginning of a pulse cycle, only a cocking gate 31 is cocked. At the moment $t_1$ of this pulse cycle, all three cocking gates 31, 32, 33 are triggered, but only cocking gate 31 then delivers a pulse. This pulse traverses the cocking winding of cocking gate 32 (which is thus cocked) and the wire $j=1$. Thus, at the beginning of the second pulse cycle, only cocking gate 32 is cocked. At the moment $t_1$ of this pulse cycle, cocking gate 32 delivers a pulse which traverses the cocking winding of cocking gate 33 and the wire $j=2$, so that cocking gate 33 is cocked. This process is repeated in cyclic sequence. It will also be evident that the triggering pulse delivered by pulse source 30 must be shorter than the pulses delivered by the cocking gates. The cocking gate to be cocked then receives for a certain period both a triggering pulse and a cocking pulse which substantially neutralize each other, and thereafter receives for a certain period only the cocking pulse which cocks the cocking gate. The triggering pulse delivered by pulse source 30 may be given a duration of, for example, 5 microseconds and the pulses delivered by the cocking gates a duration of 20 microseconds.

The member K comprises in a similar manner five cocking gates 36, 37, 38, 39, 40, circuited in the form of a ring, which are likewise triggered at the moments $t_1$ of the pulse cycles by the short pulses supplied by pulse source 30.

The member L comprises two gates 41, 42 and four cocking gates 44, 46, 45, 47 circuited in the form of a ring. The gates 41 and 42 are normally cut off, but are momentarily made conducting at the moments $t_1$ of the pulse cycles by the pulses delivered by a pulse source 43. These pulses may have a duration of, for example, 20 microseconds. Each of the cocking gates 44 and 45 has two triggering windings and is triggered by pulses that may be passed by the gates 41 and 42 at the moments $t_1$ and by pulses delivered by a pulse source 48 at the moments $t_3$. The cocking gates 46 and 47 are triggered at the moments $t_4$ by the pulses delivered by a pulse source 49. The rings corresponding to the line circuits are ranged in two matrices I and II. Matrix I contains all the rings for which the $l$ co-ordinate is equal to unity and matrix II contains all the rings for which the $l$ co-ordinate is equal to 2. The rings for which the $j$ co-ordinate has the same value (1, 2 or 3), are situated in a column for both matrices. The rings for which the $k$ co-ordinate has the same value (1, 2, 3, 4 or 5), are located in a row for both matrices. The wire $j=r$ ($r=1, 2, 3$) passes through all the rings of the $r^{th}$ column of matrix I and matrix II. The wire $k=s$ ($s=1, 2, 3, 4, 5$) passes through all the rings of the $s^{th}$ column of matrix I and of matrix II. The wire $l=1$ passes through all the rings of matrix I and is connected to the input of gate 41, the output of which is connected to a triggering terminal of cocking gate 44. The wire $l=2$ passes through all the rings of matrix II and is connected to the input of gate 42, the output of which is connected to a triggering terminal of cocking gate 45. The wires $l=1$ and $l=2$ correspond to winding 24 of FIG. 13. These windings are thus connected in series for the rings of the same matrix.

In order to explain the operation of the member L, let it be assumed that, at the beginning of a pulse cycle, only cocking gate 44 of the member L is cocked. At the moment $t_1$ of this pulse cycle, the gates 41 and 42 momentarily become conducting and any pulses induced in the wires $l=1$ and $l=2$ are thus led to the triggering terminals of cocking gates 44 and 45. However, only cocking gate 44 can deliver a pulse since this cocking gate only has been cocked. If the wire $l=1$ contained a pulse at the moment $t_1$, this pulse is thus transmitted at the moment $t_1$ via the wire $l'=1$ to the subscriber's memory AB and, at the same time, cocking gate 46 is cocked. If the wire $l=1$ did not contain a pulse at the moment $t_1$, cocking gate 44 is not triggered at the moment $t_1$, but triggered at the moment $t_3$. In this case, cocking gate 46 is cocked at the moment $t_3$ and the wire $l'=1$ contains a pulse at the moment $t_3$. The cocking gates 46 and 47 are triggered at the moment $t_4$ of the pulse cycle, but cocking gate 46 only delivers a pulse which traverses the cocking winding of cocking gate 45, which is thus cocked. At the beginning of the subsequent pulse cycle, only cocking gate 45 is thus cocked. The arrangement is now in the same state with respect to the wire $l=2$ as at the beginning of the first pulse cycle with respect to the wire $l=1$.

The circuit arrangement as a whole operates as follows. Let it be assumed that, at the beginning of a pulse cycle, only the cocking gates 31, 36 and 44 are cocked. At the moment $t_1$ of this pulse cycle, each of the wires $j=1$ and $k=1$ conveys a pulse. The rings (1, 1, 1) and (1, 1, 2) may thus flip-flop. However, of the pulses thus induced in the wires $l=1$ and $l=2$, only the pulse induced in the wire $l=1$ can reach the subscriber's memory AB (via the wire $l'=1$) since only cocking gate 44 is cocked. This means that the state of the subscriber's loop (1, 1, 1) has been read. At the beginning of the subsequent pulse cycle, only the cocking gates 32, 37 and 45 are cocked. At the moment $t_1$ of this pulse cycle, each of the wires $j=2$ and $k=2$ conveys a pulse and the rings (2, 2, 1) and (2, 2, 2) may flip-flop. Of the pulses that may thus be induced in the wires $l=1$ and $l=2$, only the pulse induced in the wire $l=2$ can reach the subscriber's memory AB (via the wire $l'=2$) since now only cocking gate 45 is cocked. In other words, the state of the subscriber's loop (2, 2, 2) has been read. Consequently, there are read successively the states of the subscriber's loops (1, 1, 1), (2, 2, 2), (3, 3, 1), (1, 4, 2), (2, 5, 1), (3, 1, 2), (1, 2, 1), (2, 3, 2). . . Since no two of the three numbers 3, 5, 2 have a common divider differing from unity, these are just all the subscribers.

Figure 16:
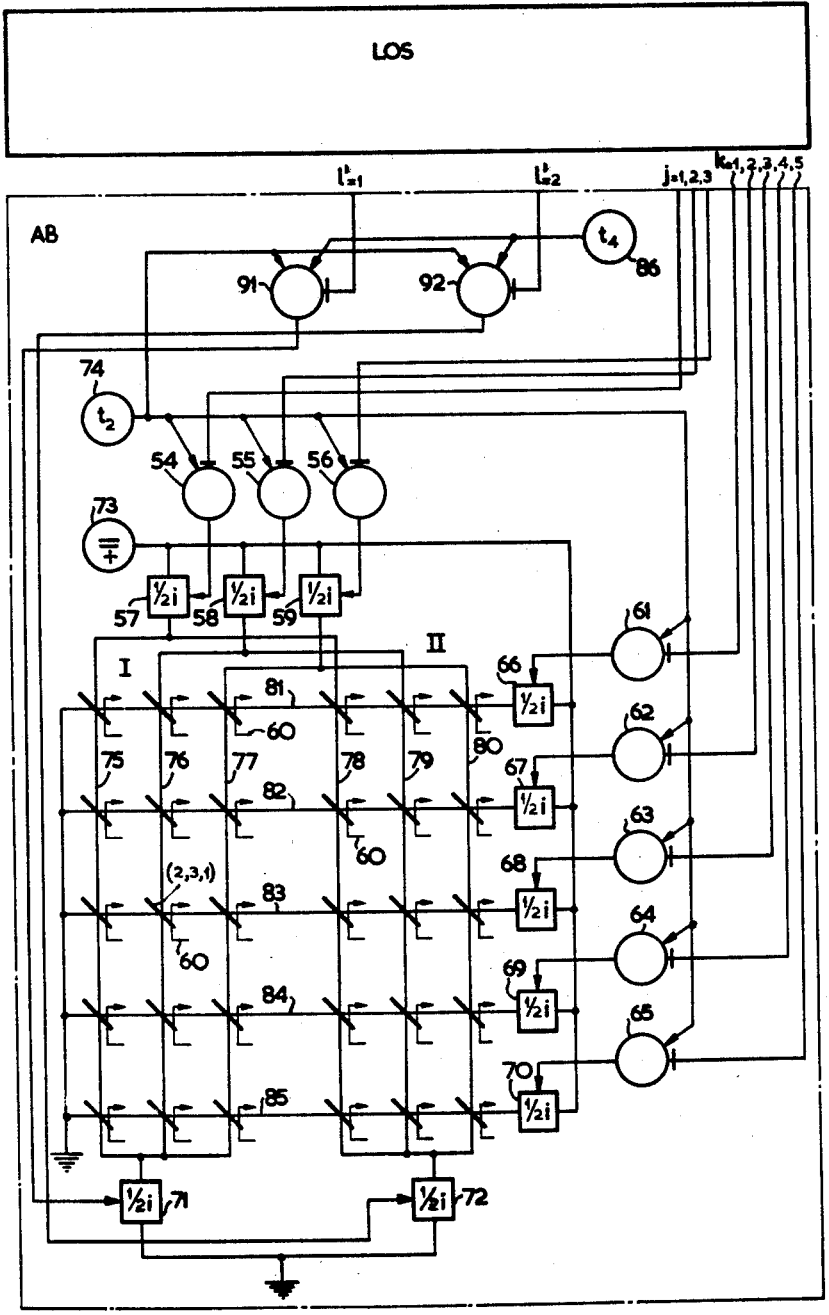

FIG. 16 shows the diagram of the subscriber's memory AB. In this figure also, each subscriber corresponds to a ring of rectangular magnetic material. The rings are ranged in two matrices in the same manner as in the circuit shown in FIG. 15. The wires $j=1, 2, 3$ are connected to the cocking terminals of three cocking gates 54, 55, 56, which are triggered by a pulse generator 74, at the moments $t_2$ of the pulse cycles. The wires $k=1, 2, 3, 4, 5$ are connected to the cocking terminals of five cocking gates 61, 62, 63, 64, 65, which are likewise triggered by pulse source 74 at the moments $t_2$. The wires $l_1=1, 2$ are connected to the cocking terminals of two cocking gates 91, 92 which are triggered by pulse source 74 at the moments $t_2$ and by a pulse source 86 at the moments $t_4$. The output terminal of cocking gate 54 is connected to the control terminal of a gate 57, the input terminal of which is connected to a positive direct-voltage source 73 and the output terminal of which is connected to a wire 75 which passes through all the rings of the first column of the first matrix and also connected to a wire 78 which is connected parallel to the first-mentioned wire and passes through all the rings of the first column of the second matrix. The wire 75 is connected to the input terminal of a gate 71 which is common to all the columns of the first matrix and the wire 78 is connected to the input terminal of a gate 72 which is common to all the columns of the second matrix. The output terminals of the gates 71 and 72 are connected to earth. The output terminals of the gates 58 and 59 are connected to correspondingly connected pairs of wires 76, 79 and 77, 80. The output terminal of cocking gate 61 is connected to the control terminal of a gate 66, the input terminal of which is connected to direct-voltage source 73 and the output terminal of which is connected to a wire 81 which passes through all the rings of the first row of the first and the second matrix and the other end of which is connected to earth. The output terminals of the cocking gates 62, 63, 64, 65 are connected in a similar manner to wires 82, 83, 84, 85. The output terminals of cocking gates 91 and 92 are connected to the control terminals of the gates 71 and 72.

The arrangement operates as follows. Let it be assumed that, in a given pulse cycle, the state of the loop of the subscriber (2, 3, 1) will be read by the loop test-circuit. If the subscriber's loop (2, 3, 1) is open, each of the wires $j=2$ and $k=3$ conveys a pulse at the moment $t_1$, but the wire $l'=1$ conveys a pulse at the moment $t_3$. Consequently, the cocking gates 55 and 63 are cocked at the moment $t_7$ but cocking gate 91 only at the moment $t_3$. If at the moment $t_2$ each of the cocking gates 55, 63 and 91 receives a triggering pulse, each of the cocking gates 55 and 63 delivers a pulse, but cocking gate 91 does not deliver a pulse since it has not yet been cocked. A current pulse of the value ½$i$ thus flows through the wire 83, but a current pulse cannot flow through the wires 76 and 79, since neither gate 71, nor gate 72 is opened at the moment $t_2$. The states of the rings of the subscriber's memory thus remain unchanged. At the moment $t_3$, the cocking gate 91 is cocked and triggered again at the moment $t_4$. The pulse then delivered by this cocking gate opens gate 71, but this remains without effect. A wire 60 threaded through the ringe (2, 3, 1) does not therefor contain a pulse.

If, however, the subscriber's loop (2, 3, 1) is closed, each of the wires $j=2$, $k=3$ and $l'=1$ conveys a pulse at the moment $t_1$, the cocking gates 55, 63 and 91 being cocked at this moment and triggered at the moment $t_2$, so that all three of them now deliver a pulse. Since, now, the gate 71 is momentarily opened at the moment $t_2$, current pulses of the value ½$i$ flow through the wires 76 and 83, which pulses drive the rings (2, 3, 1) to the state "1" (subscriber's loop closed). If the subscriber's loop (2, 3, 1) was registered as open (ring in state "0"), the ring (2, 3, 1) flips over and a pulse is induced in the wire 60, containing the information: "Subscriber (2, 3, 1) wishes to call". This information is led to the control member BO for further handling. If the subscriber's loop (2, 3, 1) was registered as closed (ring in state "1"), the ring (2, 3, 1) does not flip over and a pulse is not induced in the wire 60. This is not necessary then, since information need not be transmitted to control member BO.

Finally, the cocking gates 91 and 92 are again triggered at the moment $t_4$, but this remains without effect since neither of them is cocked.

In FIG. 16 is assumed that each ring has an individual output winding (several of these windings are indicated by 60 in FIG. 16). Such individual output windings are not necessary, however, since the information about the place of the relevant subscriber in the exchange also follows from the combination of cocking gates 54, 55, 56, 61, 62, 63, 64, 65, 91, 92 which had been cocked. All of the output windings 60 may thus, without objection, be connected in series, since these windings need deliver only the bivalent information "the relevant subscriber wishes to call or not" without indicating what subscriber is concerned. However, it may be practical to connect the output windings 60 in groups in series and to unite all of the subscribers having the same subscriber's criterions (for example "must not make a trunk call") into one group. The circuit arrangement shown in FIG. 16 thus affords a very simple possibility to deliver the subscriber's criterions.

As regards the states of the rings in the loop test-circuit and in the subscriber's memory, the cases summarized below may arise, wherein "ring in state 0" means that the subscriber's loop is open or registered as open and "ring in state 1" means that the subscriber's loop is closed or registered as closed.

|   | LOS | AB | State of subscriber's set |
|---|---|---|---|
| 1 | 0 | 0 | Subscriber's set is free. |
| 2 | 0 | 1 | Subscriber's set has been called, but receiver not lifted, or subscriber has replaced his receiver after a call, but this has not yet been dealt with by the BO. |
| 3 | 1 | 0 | Subscriber has just lifted his receiver and wishes to make a call. |
| 4 | 1 | 1 | Subscriber's set is busy. |

Case 3 is possible due to the fact that the period with which the rings in the loop test-circuit are read may be comparatively large (for example about 0.2 sec.) so that the receiver of a subscriber's set may already have been lifted, but this fact has not yet been detected by the loop test-circuit nor passed on to the subscriber's memory. In order to determine whether a called subscriber may be connected to a calling subscriber, it is thus practical to read both the ring of the loop test-circuit and the ring of the subscriber's memory. The relevant ring of the subscriber's memory is thus set to the state "1." If now, case 1 of the above-mentioned table has been determined, case 2 follows and connection to the calling subscriber may be built up via control member BO and adjusting member JO. This takes up about 4 microseconds, so that the possibility of the called subscriber then just lifting his receiver is very small. If one of the cases 2, 3 and 4 is determined, the called subscriber's set must not be connected to the calling subscriber's set and the control member BO must provide for the latter receiving the busy tone. By reading a ring of the subscriber's memory, this ring is set to the state "1" if it was not already in the state 1. However, in case 3 of the table, it must be possible to neutralize this again, since otherwise the relevant subscriber were registered in the state 4 so that he cannot make a call. This re-setting of a ring of the subscriber's memory to the state "0" is effected under control of the control member. The above-described system for determining whether connection to a called subscriber may be built up or not is better than reading only the state of the relevant ring in the subscriber's memory, which is fundamentally also possible, but which requires a small mean period of the loop test-circuit. This may be achieved by either making the loop test-circuit extremely fast, or connecting to it comparatively few subscribers' sets.

It will be evident that a wrong state of a ring of the subscriber's memory must be avoided as much as possible. If a ring wrongly occupies the state 1, the exchange determines the state 2 or the state 4. As a result thereof, the relevant subscriber neither can ring up himself, nor can be rung up. If a ring of the subscriber's memory wrongly occupies the state "0," it may be connected to two other subscribers in rapid succession (if it is in the state 2) or it wrongly busies the control member (if it is in the state 4). In view of the latter case, it is desirable for the control member to be designed so that if an incoming information "subscriber so and so wishes to call" is not followed by further information within a given time interval, it is found out whether the said subscriber is not already speaking. In the latter case, the relevant ring may be set to the state "1." This is possible due to the states of the subscribers also being registered elsewhere in the exchange, for example in registers guarding or controlling the connecting circuits.

From the foregoing it appears that the loop test-circuit and the subscriber's memory need some further possibilities which are absent in the circuits shown in FIGS. 15 and 16. These additional possibilities are:

a. It must be possible momentarily to stop the normal function of the loop test-circuit and to read the state of an arbitrary ring.
b. It must be possible to set the loop test-circuit to a given initial state.
c. It must be possible to read the state of an arbitrary ring of the subscriber's memory.
d. It must be possible for any arbitrary ring of the subscriber's memory to be set either to the state "0" or the state "1."

The loop test-circuit may be made inoperative by stopping the pulse sources 30, 43, 48, 49. This is very simple if these pulse sources are cocking gates which are cocked, for example, at the moments $t_5$ of the pulse cycles and triggered at the relevant moments of the pulse cycles. It is thus necessary only to check the cocking pulses, for example, by means of a gate. It is alternatively possible to provide each of the rings of the cocking gates 30, 43, 48, 49 with an additional winding, thus causing a current opposite to the cocking current, which makes cocking impossible.

Figure 17:
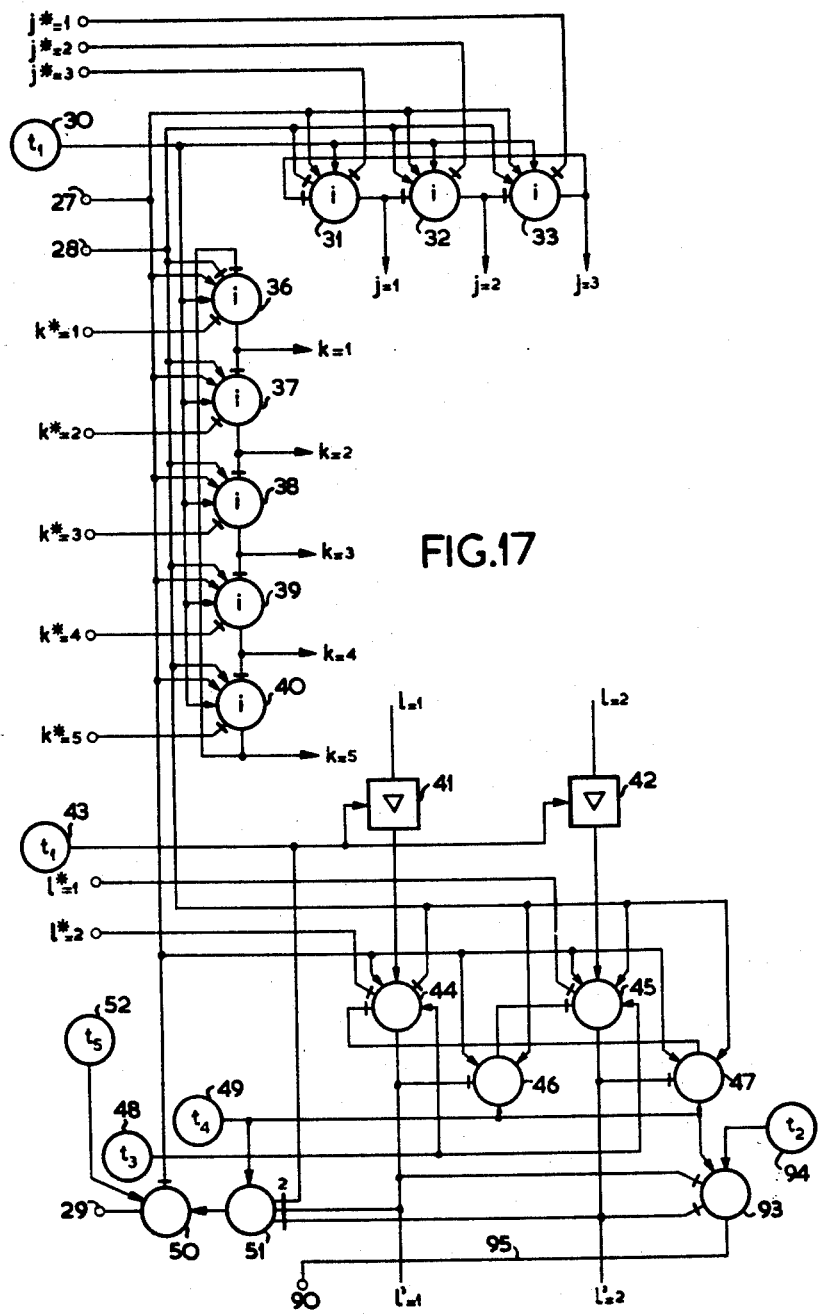
FIGS. 17, 18 show more detailed diagrams of the circuit shown in FIGS. 15 and 16.

FIG. 17 shows the diagram of a control circuit of the matrices of the loop test-circuit which permits the additional functions $a$ and $b$. The differences with respect to the control circuit shown in FIG. 5 are the following:

(1) The cocking gates 31, 32, 33, 36, 37, 38, 39, 40, 44, 45, 46, 47 includes second triggering windings, all of which are connected in series and connected to a terminal 27. If a current pulse of sufficient strength and duration is passed through these second triggering windings, all of the cocking gates assume the triggered state. It will be evident that this pulse must be longer than the pulses triggering the cocking gates, for example 40 microseconds if the pulses delivered by the cocking gates are 20 microseconds.

(2) The cocking gates 31, 32, 33, 34, 36, 37, 38, 40, 44, 45 have second cocking windings which are connected to terminals $j^*=1$, $j^*=2$, $j^*=3$, $k^*=1$, $k^*=2$, $k^*=3$, $k^*=4$, $k^*=5$, $l^*=1$, $l^*=2$. After all of the cocking gates, 31, 32, 33, 36, 37, 38, 39, 40, 44, 45, 46, 47 have been triggered at a moment $t_3$, then at a later moment, for example at a moment $t_5$, any of the cocking gates 31, 32, 33, any of the cocking gates 36, 37, 38, 39, 40 and any of the cocking gates 44, 45 may be cocked, this combination of cocking gates being triggered at the moment $t_1$ of the subsequent pulse cycle.

(3) The loop test-circuit also includes a cocking gate 50 having one cocking winding and a cocking gate 51 having three cocking windings. The latter is designed so that it is cocked only if a pulse is led to at least two of the three cocking terminals. The cocking winding of cocking gate 50 is connected in series with the second triggering terminals of the cocking gates 31, 32, 33, 36, 37, 38, 39, 40, 44, 45, 46, 47, the cocking gate 50 being triggered by the pulse delivered by cocking gate 51, but at the same time, through a second triggering winding, by the pulses delivered by a pulse source 52 at the moment $t_5$. The three cocking windings of cocking gate 51 are traversed respectively by the pulses delivered by pulse source 43 at the moments, $t_1$, by the pulses delivered by cocking gate 44 at the moments $t_1$ or $t_3$, and by the pulses delivered by cocking gate 45 at these moments. Cocking gate 51 is triggered by the pulses delivered by pulse source 49 at the moments $t_4$. The output winding of cocking gate 50 is connected to a terminal 29. Cocking gate 51 thus delivers an output pulse only if one of the cocking gates 44 and 45 has delivered an output pulse at the moment $t_1$. However, the pulse delivered by cocking gate 51 can be passed on by cocking gate 50 only if this pulse has been attained by first wiping the loop test-circuit (pulse to terminal 27) and then adjusting to a subscriber ($r$, $s$, $t$) (pulses to the terminals $j=r$, $k=s$, $l=t$). The triggering terminal of cocking gate 50, which is connected to pulse source 52, provides for the source at any time being left empty.

(4) Each of the cocking gates 31, 36, 44 includes a third cocking winding and each of the cocking gates 32, 33, 37, 38, 39, 40, 45, 46, 47 includes a third or a second triggering winding. All of these windings are connected in series and coupled to a terminal 28. If a pulse of sufficient duration is led to this terminal, the loop test-circuit is adjusted to the subscriber (1, 1, 1).

(5) The circuit includes a gate 93 having two cocking windings which are connected in series with the wires $l'=1$ and $l'=2$. The cocking gate 93 is thus cocked when the wire $l'=1$ or the wire $l'=2$ contains a pulse. The cocking gate is triggered at the moments $t_2$ by the pulses delivered by a pulse source 94. The output terminal of cocking gate 93 is connected through a wire 95 to a terminal 90. A pulse occurring in the wire 95 at the moment $t_2$ thus implies the information: "a closed loop has been determined."

Figure 18:
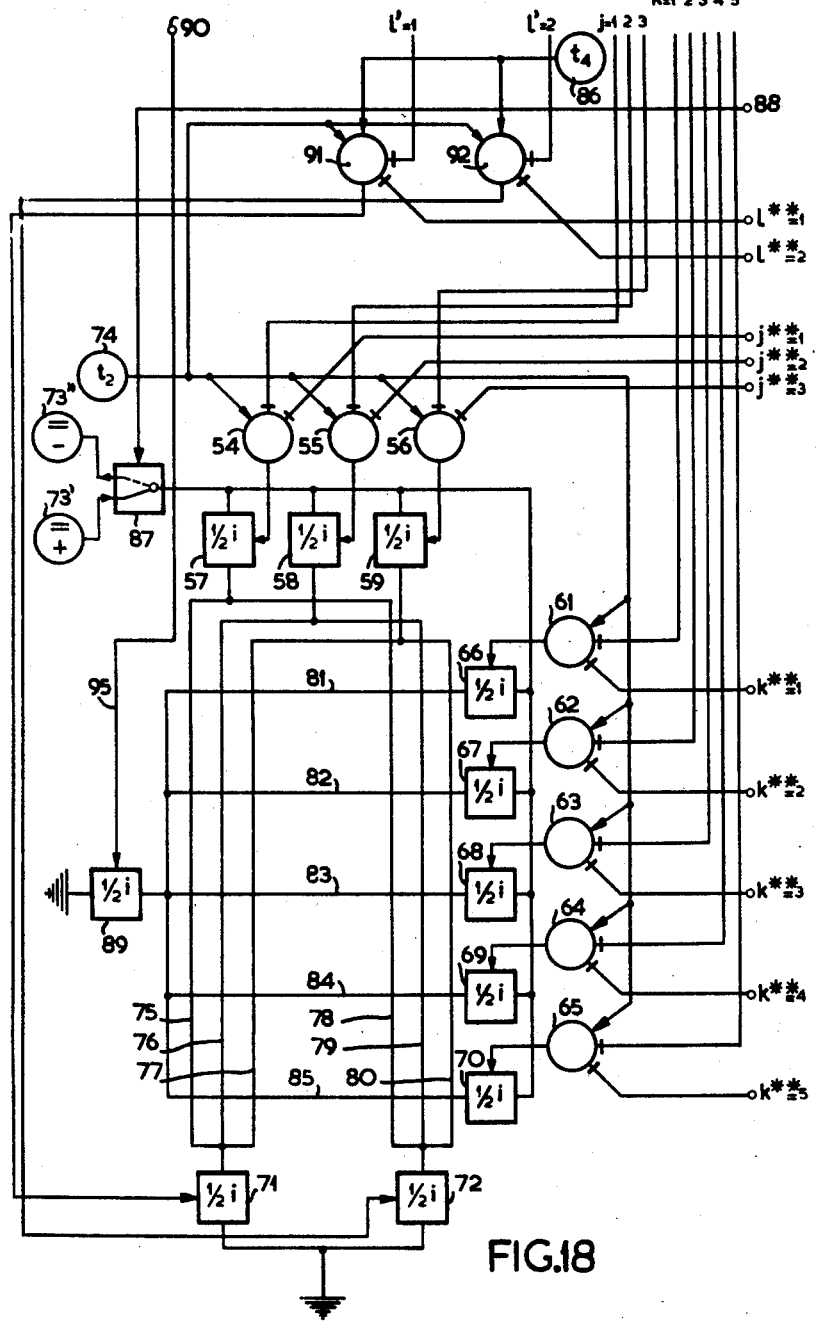

FIG. 18 shows the diagram of a control circuit of the matrices of the subscriber's memory which permits the additional functions $e$ and $d$. The differences with respect to the control circuit shown in FIG. 6 are the following:

(1) Each of the cocking gates, 54, 55, 56, 61, 62, 63, 64, 65, 91, 92 has a second cocking winding. These second cocking windings are connected to terminals $j^{}=1$, $j^{}=2$, $j^{}=3$, $k^{}=1$, $k^{}=2$, $k^{}=3$, $k^{}=4$, $k^{}=5$, $l^{}=1$, $l^{}=2$. It is thus possible to cock any one of the cocking gates 54, 55, 56, any one of the cocking gates 61, 62, 63, 64, 65, and any one of the cocking gates 91, 92. This may be effected, for example, at a moment $t_5$. At the moment $t_2$ of the subsequent pulse cycle, the combination of cocked cocking gates is triggered, it then being necessary, of course, to stop the function of the loop test-circuit during the pulse cycle in which such trigerring occurs, since ohterwise unwanted cocking gates would also be cocked.

(2) The input terminals of the gates 57, 58, 59, 66, 67, 68, 69, 70 are connected to the output terminal of an electronic switch 87. The input terminals of this switch are connected to a positive direct-voltage source 73' and to a negative direct-voltage source 73". The control terminal of the switch is connected to a terminal 88. The electronic switch is designed so that it is normally conducting only for the current supplied by the positive direct-voltage source 73', but due to the action of a pulse led to terminal 88 becomes conducting only for the current supplied by the negative pulse source 73". This makes it possible for any arbitrary ring of the subscriber's memory to be set either to the state "0" or the state "1." It must then be possible, of course, for the gates 57, 58, 59, 66, 67, 68, 69, 70, 71, 72, to be momentarily made conducting in both senses under the control of a pulse.

(3) The wires 81, 82, 83, 84, 85 are now connected to earth via a gate 89. The control terminal of this gate is connected to terminal 90. The gate is again designed so that it momentarily becomes conducting in both senses if a pulse is led to terminal 90. This affords the possibility of using two or more loop test-circuits, all of which co-act with the same subscriber's memory and each of which deals with a given group of subscribers. Each subscriber is then characterized by a quadruple of four numbers (a, b, c, d,) the last of which indicates the loop test-circuit which deals with the relevant subscriber.

(4) Each of the rings of the subscriber's memory has threaded through it a wire (omitted in FIG. 18 for the sake of simplicity) which permits of setting all of the rings to the state "0." This is possible since it is also registered at other areas in the exchange, for example in registers dealing with the connecting circuits, which state the connected subscribers occupy. By means of the last-mentioned members the states of the subscribers may be registered again so that any errors in the subscriber's memory are corrected.

It will be evident that the spurious outputs induced by rings not read out may be compensated in known manner. Since this has no relation with the invention, such compensation is not shown in the diagrams.

The loop test-circuit and subscriber's memory can receive its input information from the control member in coded form. If such is the case, it is necessary to add a decoder to the loop test-circuit. It may even be practical to position a decoder between the loop test-circuit and the subscriber's bookkeeping. This is neither in inventive relation with the invention so that such decoders, which may otherwise be of known type, need not be discussed or shown in the drawings.

Figure 19:
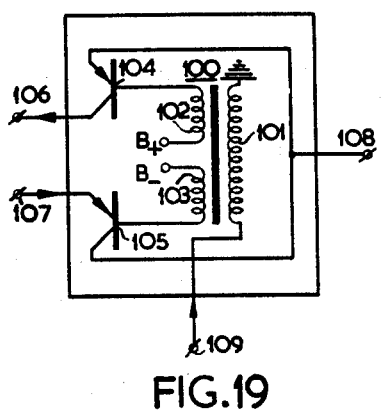
FIG. 19 shows an example of an electronic switch.

FIG. 19 shows a possible embodiment of the electronic switch 87 of FIG. 18. This is essentially a doubling of the circuit shown in FIG. 11. Instead of one transistor, the circuit now has two transistors 104 and 105 which may be made conducting in opposite senses. Transistor 104 is normally kept closed by the positive voltage source B+ and transistor 105 kept conducting by the negative voltage source B—. Current can thus flow from a terminal 107 to a terminal 108, if terminal 107 is connected to a positive voltage source and terminal 108 is connected to earth. However, if a pulse is led to a terminal 109, the base of transistor 104 momentarily becomes negative and the base of transistor 105 is momentarily made positive, so that the first-mentioned transistor is momentarily made conducting and the last-mentioned transistor is momentarily cut off. A current pulse thus flows from terminal 108 to terminal 106, provided the first-mentioned terminal is connected to earth and the last-mentioned terminal is connected to a negative voltage source.

Figure 20:
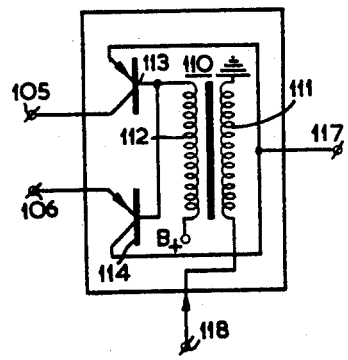
FIG. 20 shows an example of a bilateral gate.

FIG. 20 shows a possible embodiment of the bilateral electronic gates 57, 58 etc., of FIG. 18. This circuit also is a doubling of that shown in FIG. 11 and, as before, the two transistors are connected in opposition. The bases of the two transistors are normally kept positive by the positive voltage source B+ so that both transistors are cut off. However, when a pulse is led to a terminal 118, the bases of the two transistors are momentarily made negative. If a terminal 117 is then connected to earth, terminal 106 is connected to a positive voltage source and terminal 105 is not connected, a current pulse flows from terminal 106 to terminal 117. If, however, terminal 117 is connected to earth, terminal 105 is connected to a negative voltage source and terminal 106 is not connected, then a current pulse flows from terminal 117 to terminal 105.

It is naturally possible to replace each of the circuits of FIGS. 19 and 20 by two gates of the type shown in FIG. 11, but the control then becomes a little more complicated since different control pulses must be used for pulses in one sense and pulses in the other.

What is claimed is:

1. An automatic telecommunication exchange comprising a first source of cyclically occurring pulses providing sequential pulses at $a$ output terminals, a second source of cyclically occurring pulses providing sequential pulses at $b$ output terminals, a matrix of $ab$ rings of magnetic material having rectangular characteristics and arranged in $a$ columns and $b$ rows, each of said rings having an input winding, a first winding corresponding to an output terminal of the first source, a second winding corresponding to an output terminal of the second source and an output winding, means connecting the $j$th terminal of the first source to the first windings of all rings of the $j$th column, means connecting the $k$th terminal of the second source to the second windings of all rings of the $k$th row, and output circuit means connected to said output windings, said sources and windings being arranged so that for each ring cycles of pulses occur in which both of the respective first and second windings of every ring convey pulses, wherein $a$ and $b$ are predetermined natural numbers, and $j$ and $k$ are natural numbers equal to or less than $a$ and $b$, respectively.

2. An automatic telecommunication exchange of the type having a plurality of subscriber's sets connected to separate line circuit means, and in which each line circuit means has signal wire means for conveying the open or closed state of the respective subscriber's set, said exchange comprising a first source of cyclically occurring pulses providing sequential pulses at $j$ first output terminals, a second source of cyclically occurring pulses providing sequential pulses at $k$ second output terminals, a matrix of $jk$ rings of magnetic material having rectangular characteristics and arranged in $j$ columns and $k$ rows, each of said rings having an input winding, a first winding, a second winding and an output winding, means connecting said input windings to separate signal wire means, means connecting each first terminal to the first windings of a separate column of said matrix, means connecting each second terminal to the second windings of a separate row of said matrix, and output circuit means connected to said output windings, said windings and sources being arranged so that for each ring of said matrix cycles of pulses occur in which both of the respective first and second windings convey pulses, wherein $j$ and $k$ are natural numbers.

3. An automatic telecommunication exchange comprising a first source of cyclically occurring pulses providing sequential pulses at $j$ first output terminals, a second source of cyclically occurring pulses providing sequential pulses at $k$ second output terminals, $l$ matrices of $jk$ rings of magnetic material having rectangular characteristics, the rings of each of the matrices being arranged in $j$ columns and $k$ rows, each of said rings having an input winding, a first winding, a second winding and an output winding, means connecting each first terminal to the first windings of a separate column of each of said matrices, means connecting each second terminal to the second windings of a separate row of each of said matrices, $l$ gate circuit means, means connecting each gate circuit means to the output windings of a separate matrix, and means for sequentially rendering said gate circuit means conductive, said sources and windings being arranged so that for each ring of each of said matrices cycles of pulses occur in which both of the respective first and second windings convey pulses, wherein $j$, $k$ and $l$ are natural numbers.

4. An automatic telecommunication exchange comprising $j$ first cocking gates having cocking, firing and output terminals, $k$ second cocking gates having cocking, firing and output terminals, a source of cyclically occurring pulses, means connecting said source to the firing terminals of said first and second gates, means connecting the output terminal of each first and second gate to the cocking terminal of another first and second gate respectively, a matrix $jk$ rings of magnetic material having rectangular characteristics and arranged in $j$ columns and $k$ rows, each of said rings having an input winding, a first winding, a second winding, and an output winding, means connecting the output winding of each first gate to the first windings of a separate column, means connecting the output terminal of each second gate to the second windings of a separate row, and output circuit means connected to said output windings, said gates and windings being arranged so that for each ring of said matrix cycles of pulses occur in which both of the respective first and second windings convey pulses, wherein $j$ and $k$ are natural numbers.

5. An automatic telecommunication exchange comprising $j$ first cocking gates having cocking, firing and output terminals, $k$ second cocking gates having cocking, firing and output terminals, a source of cyclically occurring pulses, means connecting said source to the firing terminals of said first and second gates, means connecting the output terminal of each first and second gate to the cocking terminal of another first and second gate respectively, $l$ matrices of $jk$ rings of magnetic material having rectangular characteristics, the rings of each matrix being arranged in $j$ columns and $k$ rows, each of said rings having an input winding, a first winding, a second winding and an output winding, means connecting the output winding of each first gate to the first windings of a separate column of each matrix, means connecting the output terminal of each second gate to the second windings of a separate row of each matrix, $l$ gate means, means connecting each gate means to the output winding of a separate matrix, and means for sequentially rendering said $l$ gate means conductive, wherein $j$, $k$ and $l$ are natural numbers.

6. The exchange of claim 5, in which said $l$ gate means comprise $l$ first cocking gates having firing, output and cocking terminals, means connecting the firing terminals of said $l$ first gate means to said output windings, said means for sequentially rendering said $l$ gate means conductive comprising $l$ second cocking gate means having firing, output and cocking terminals and a second source of cyclically occurring pulses, means connecting said second source to the firing terminals of said second gate means, and means connecting the output terminal of each first and second gate means to the cocking terminal of a second and first gate means respectively, whereby said first gate means are sequentially cocked.

7. The exchange of claim 6, in which said means connecting the firing terminals of said first gate means comprises third gate means, and means for rendering said third gate means conductive during the occurrence of said cyclically occurring pulses, and in which said first gate means have second firing terminals connected to a third source of cyclically occurring pulses, the pulses of said first-mentioned source in each gate occurring before the pulses of said second and third sources, and the pulses of said third source occurring before the pulses of said second source.

8. A telecommunication exchange comprising first, second and third sources of cyclically occurring pulses occurring in that order in each cycle, means connected to said first source for providing sequentially occurring pulses to first and second terminals, $l$ matrices of $jk$ rings of magnetic material having rectangular characteristics, the rings of each matrix being arranged in $j$ columns and $k$ rows, each ring having an input winding, a first winding, a second winding, and an output winding, means connecting each first terminal to the first windings of a separate column in each matrix, means connecting each second terminal to the second windings of a separate row in each matrix, $l$ cocking gate means each having a first and second firing terminal, a cocking terminal, and an output terminal, means connecting said third source of pulses to said cocking terminals for sequentially cocking said gate means, means connecting the first firing terminal of each gate means to the output windings of a separate matrix, and means connecting said second firing terminals to said second source, wherein $j$, $k$ and $l$ are natural numbers.

9. The exchange of claim 8, in which said means providing sequentially occurring pulses to first and second output terminals comprises first and second groups of $p$ first and $q$ second cocking gates respectively, each connected in the form of a ring with the output terminal of each cocking gate being connected to the cocking terminal of the subsequent cocking gate in the respective group, the output terminals of said first cocking gates being connected to the first windings of separate columns of each matrix, the output terminals of said second cocking gates being connected to the second windings of separate rows of each matrix, the firing windings of each first and second gates being connected to said first source, wherein $p$ and $q$ are relatively non-divisible integers.

10. The exchange of claim 8, in which the output windings of each matrix are serially connected, said means connecting said first firing terminals to said output windings comprises gate means, and means cyclically rendering said last-mentioned gate means conductive during the occurrence of the pulses of said first source.

11. A telecommunication exchange comprising first, second and third sources of cylically occuring pulses occurring sequentially in that order in each cycle, $j$ first, $k$ second and $2l$ third groups of cocking gates, respectively, each group of gates being connected in the form of a ring with the output terminal of each gate being connected to a cocking terminal of the subsequent gate in the respective group, $l$ matrices of $jk$ rings of magnetic material having rectangular characteristics, the rings of each matrix being arranged in $j$ columns and $k$ rows, each ring having an input winding, first winding, a second winding, and an output winding, means connecting a firing terminal of each first and second gates to said first source, means connecting the output terminal of each first and second gates to the first and second windings respectively of a separate column and row respectively of each matrix, alternate said $2l$ third cocking gates having first and second firing terminals, means connecting said first firing terminals of each said alternate gate to the output windings of a separate matrix, means connecting said second firing terminals to said second source, and means connecting the firing terminals of the remaining of said $2l$ third gates to said third source, wherein $j$, $k$ and $l$ are natural numbers.

12. The exchange of claim 11, in which each of said cocking gates comprises an additional triggering terminal, and means for simultaneously triggering said additional terminals.

13. The exchange of claim 11, in which one cocking gate of each group comprises an additional cocking terminal, and the other cocking gates of each group comprise an additional triggering terminal, means for interconnecting said additional terminals, and means for applying pulses to said additional terminals.

14. The exchange of claim 11, in which each of said cocking gates comprises an additional cocking terminal, means connected to said additional terminals for simultaneously cocking all of said gates, and means for triggering said gates.

15. The exchange of claim 11, comprising an additional cocking gate having $l$ cocking terminals connected to the output terminals of said alternate cocking gates, a firing terminal connected to a further source of cyclically occurring pulses, and an output terminal, the pulses of said fourth source occurring between the pulses of said first and second sources.

16. The exchange of claim 11, comprising a first additional cocking gate connected to be cocked by double coincidence of a pulse at an output terminal of one of said alternate cocking gates and a pulse of said first source, means connecting said third source to a firing terminal of said first additional gate, a second additional gate having a firing terminal connected to the output terminal of said first additional gate, means for applying firing pulses to all of said gates of said groups and for cocking said second additional gate.

17. A telecommunication exchange of the type having a plurality of subscriber's sets connected to separate line circuit means, in which each line circuit means has signal wire means for conveying the open or closed state of the respective subscriber's set, memory means for registering the state of said subscriber's sets, and control means connected to receive information from other members of the exchange, including the memory means, for determining the destination of such information and for performing control operations indicated by such information, said exchange comprising a loop test circuit having a first source of cyclically occurring pulses providing sequential pulses at $j$ first output terminals, a second source of cyclically occurring pulses providing sequential pulses at $k$ second output terminals, a first group of $l$ matrices of $jk$ rings of magnetic material having rectangular characteristics, the rings of each matrix being arranged in first columns and $k$ rows, each said ring having an input winding, a first winding, a second winding, and an output winding, means connecting said input windings to separate said signal wire means whereby each ring corresponds to a separate subscriber's set, means connecting each first terminal to the first windings of a separate column of each of said matrices, means connecting each second terminal to the second windings of a separate row of each of said matrices, $l$ first gate circuit means, means connecting each gate circuit means to the output windings of a separate matrix means for sequentially rendering said gate circuit means conductive, said sources and windings being arranged so that for each ring of each of said matrices cycles of pulses occur in which both of the respective first and second windings convey pulses, and means connecting the output terminals of said gate circuit means and said first and second output terminals to said memory means, wherein $j$, $k$ and $l$ are natural numbers.

18. The exchange of claim 17, in which said memory means comprises a second group of $l$ matrices of $jk$ rings of magnetic material having rectangular characteristics, the rings of each matrix of said second group being arranged in $j$ columns and $k$ rows with each ring having third, fourth, and output windings, third gate means connecting the third windings of each column of each matrix of said second group with a separate first output terminal fourth gate means serially connecting the second windings of each row of each matrix of said second group with a separate second terminal, fifth gate means connected to each third winding of a separate matrix of said second group, and means for cyclically rendering said third, fourth and fifth gate means conductive.

19. The exchange of claim 18, in which said third, fourth and fifth gate means comprise cocking gates having their cocking terminals connected to said first terminals, second terminals, and output terminals of said $l$ first gate circuit means respectively, and said means for cyclically rendering said first, fourth and fifth gate means conductive comprises a source of cyclically occurring pulses connected to triggering terminals of said last-mentioned cocking gates.

20. The exchange of claim 19, comprising means for selectively changing the state of said rings of said second group.

References Cited in the file of this patent
UNITED STATES PATENTS

| | | |
|---|---|---|
| 2,917,583 | Burton et al. | Dec. 15, 1959 |
| 2,947,818 | Ward | Aug. 2, 1960 |
| 2,947,819 | Brightman et al. | Aug. 2, 1960 |